Oct. 20, 1953     E. T. WILMINGTON     2,655,739

HOROLOGICAL EDUCATIONAL DEVICE

Filed June 6, 1952

INVENTOR.
Edna T. Wilmington

BY *David Mark Adler*

Attorney

Patented Oct. 20, 1953

2,655,739

UNITED STATES PATENT OFFICE 2,655,739

HOROLOGICAL EDUCATIONAL DEVICE

Edna T. Wilmington, Chicago, Ill.

Application June 6, 1952, Serial No. 292,122

2 Claims. (Cl. 35—39)

My invention relates to horological devices used for educational purposes.

An important object of my invention is to provide an instrumentality of the aforementioned character which may be utilized for teaching children how to tell time.

A still further object of my invention is to provide an article of the aforementioned character which is made up of a dial section, a rotatable transparent disc element, having a peripheral portion thereof made opaque and leaving an arcuate opening of transparent qualities; the said disc element having opaqued thereon the minute hand, which has a translucent portion so as to permit slight visibility therethrough in order to detect the hour numerals which it may cover; the transparent arcuate portion permitting the minute indicia to show therethrough when in registry therewith, and an hour hand which is rotatably secured to the assemblage by grommet means.

Another object of my invention is to provide an improved structure of the aforementioned character wherein the spaces between hour designating indicia is subdivided into four parts; the hour indicia being identified by a dot or similar symbol.

A still further object of my invention is to provide a slight modification for teaching youngsters to tell time, consisting of a transparent disc element having a peripheral portion thereof opaqued leaving a small arcuate transparent section, a minute hand opaqued thereon having a translucent portion in registry with the indicia conveying the hour information, and an hour hand rotatably secured with respect to the said disc-like element, the assemblage being secured by means of a grommet, the lower portion of the grommet also holding suction cup means to permit the invention to be readily attached to the central portion of the glass covering the dial of a clock, in other words, in congruent and co-axial alignment with the pivot supporting the hour and minute hands on the clock proper.

Another object of my invention is to provide an instrumentality of the aforementioned character which is economical to manufacture, practical for the purposes for which it is purported to be used, and of such elemental construction as to enable the same to be manufactured economically in quantity production.

Other features, ancillary objects, and inherent advantages resident in my invention will become apparent from an examination of the accompanying drawings, elucidated further in the ensuing description, where like numerals are used to designate like parts, and in which.

Figure 1:
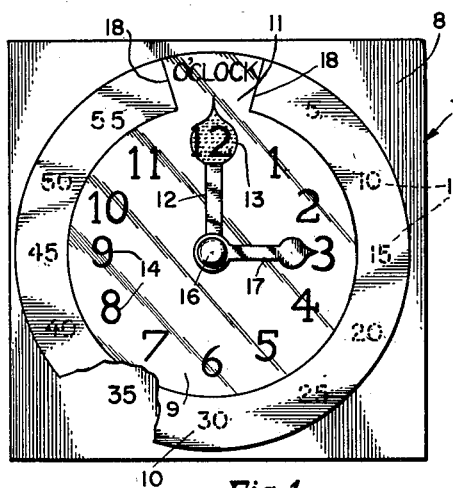
Fig. 1 is a front view of one form of my invention.

Referring to Figs. 1, 2, 3, and 4, my invention is, generally, designated 7 and consists of a dial element 8 of preferably quadrilateral formation having imprinted thereon the hour numerals designated 14 in circular arrangement as they would appear on the dial of a clock. On the central portion thereof, a grommet 16 secures rotatably an hour hand 17 and a transparent disc element 9. The said transparent disc element 9 has an opaque portion throughout its entire periphery designated 10, with the exception of a small vacant space 11, the opaque portion terminating at 18 so as to permit fractional portions of the dial to become visible whereon the minute numerals in five minute intervals are imprinted on the dial 8.

On the transparent disc 9 is also opaqued a minute hand 12 having its terminal portion 13 made translucent so as to permit some of the hour numerals 14 to be seen therethrough, however, not as clearly as the minute symbols or indicia 15 are seen through the vacant or transparent portion 11.

In securing the said mechanism by the grommet means 16 it will be noted that the hour hand 17 and the disc structure 9 are independently rotatable so as to permit of various horal settings. It can be seen in Fig. 2 that the hour hand is pointing to the numeral 8 indicating the hour, and the minute hand is pointing to the numeral 5 indicating five minutes past the hour. The Ben Day portion 13 thus indicates a lesser visibility of the numeral 1 thereunder so as not to confuse the one being taught, or the student, causing him or her to read the incorrect number. However, after the education of the individual, the clocks which do not possess minute indicia 15 will inform the student to associate the hour numerals 14 with the numerals 15, namely, the one o'clock with five minutes after, two o'clock, ten minutes after, and so on.

It is to be noted that the device comprising my invention is closely related to a clock structure, so that after the education of the youngster has been completed, the clock face and dial will not appear strange to the youngster enabling the individual to tell time on a conventional clock.

Figure 4:
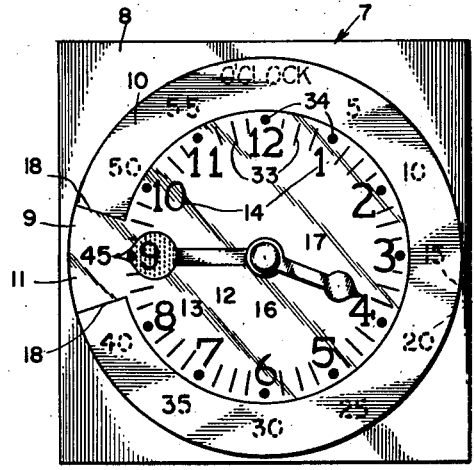
Fig. 4 is a view similar to Figs. 1 and 2 and shows a slightly modified form of my invention; indicating calibrations to permit setting the hands more accurately.

A slight improvement of my invention is indicated in Fig. 4. To facilitate the setting of the hands to their proper positions shown in that figure, namely, the hour indicia are spotted with dot indications 34, the space between adjacent dot indications 34 being subdivided into four sections by the lines 33 thus indicating each fifteen-minute period or quarter of an hour, so that the setting a quarter-to-four indicated in that view can be readily positioned.

Figure 6:
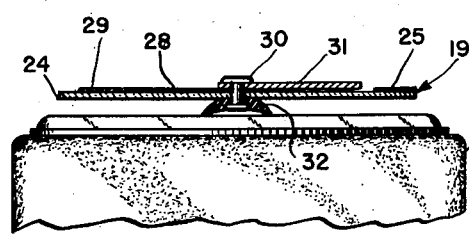
Fig. 6 is a cross-sectional view taken, substantially, on the lines 6—6 of Fig. 5.
Figure 5:
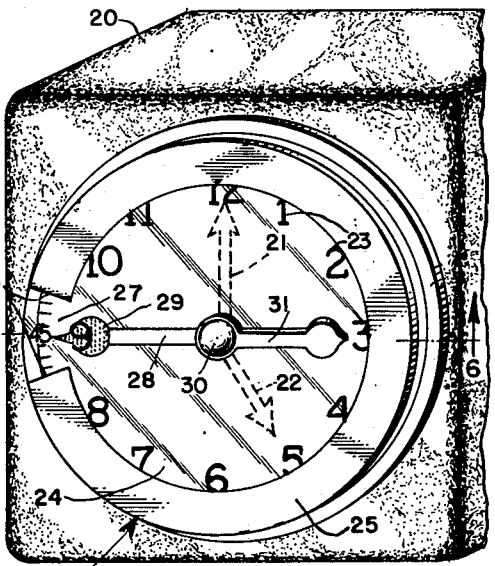
Fig. 5 is a perspective view showing a slightly modified form of my invention used in connection with a conventional clock mechanism.

In Figs. 5 and 6 I show a slight modification of my invention wherein the dial of a conventional clock 20 is utilized and a dial element 8 is dispensed with. In this particular instance, the dial element is replaced by an attaching means such as a resilient suction cup 32 which is secured to the grommet structure 30; the modification in this instance being designated, generally, 19; included also is a transparent disc element 24 having the opaque portion 25 embracing an ambit indicated by the lines 26 peripherally throughout the entire disc-like element leaving a transparent opening 27; an opaque minute hand 28 having a translucent tip portion 29, and the numerals 23 appear in this instance on the clock dial which has the hands 21 and 22 indicated in dotted lines which are to be ignored by the student or the person being taught.

The hour hand 31 is rotatably secured in intimate contacting relationship with the transparent disc 24 and the open space 27 which is transparent and not opaque permits reading any numerals or divisions that may appear on the clock dial to facilitate the setting of the hours and minutes or fractional parts of hours, as between hour indicia 23.

The device designated 19 is attached in congruent relationship with the axis of the clock hands 21 and 22 or the pivots on which they are mounted, or in co-axial alignment therewith as indicated in Figs. 5 and 6.

The device, as illustrated in Figs. 1 to 4, may be utilized independently of any conventional clock structure, and will afford a convenience for setting the various hours for educational and examination purposes for the student.

It should be noted that the minute hand is opaqued on the disk portion and is in a central position with respect to the vacant or arcuate transparent section 11 as shown. The illustration in Fig. 4 will permit of a more accurate setting by the instructor. The illustrations in Figs. 5 and 6 indicate that a simpler construction may be utilized to be removably attachable by virtue of a resilient suction cup element 32 and associated with the dial of a conventional clock 20 in which instance the student will be informed to ignore the conventional hands of the clock 21 and 22 and concentrate on the hands 28 and 31 while he or she is being taught.

This device likewise is utilized by manipulating the hands 28 and 31 to various positions for instructing the student, or for test, or examination, of the student.

Figure 2:
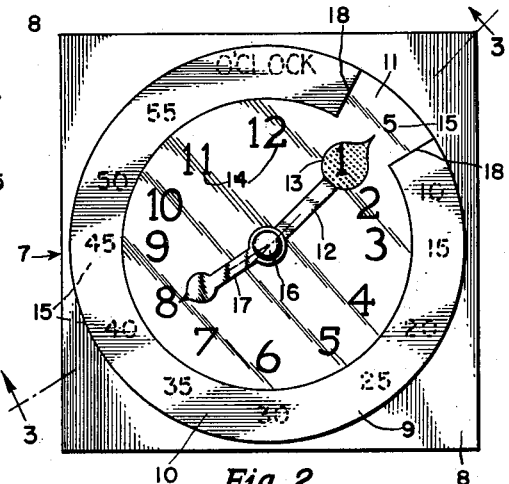
Fig. 2 is a view similar to Fig. 1 showing how the time settings can be arranged at will.
Figure 3:
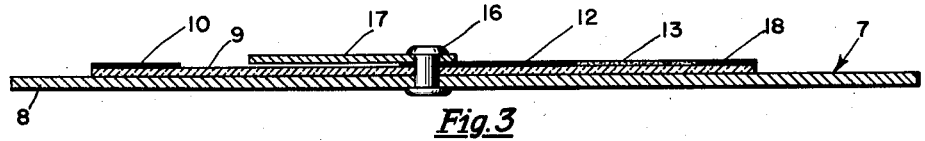
Fig. 3 is a cross-sectional view taken, substantially, on the lines 3—3 of Fig. 2.

The opaque portions 10 and 25 in Figs. 4 and 5, like the one in Figs. 1 and 2, defines the arcuate transparent portion associated with the translucent tip 29 of the minute hand 28 to facilitate reading the minutes after the hour, i. e. 5 minutes after 8:00 o'clock, or 8:05 or in Fig. 4, forty-five minutes after 3:00 o'clock, or 3:45. To retain at a later time the association with conventional clocks, and with the manner in which time is written, one never writes a quarter of four, rather one writes 3:45.

Although the drawings and the above specification disclose the best modes in which I have contemplated embodying my invention, I desire to be in no way limited to the details of such disclosure, for in the further practical application of my invention many changes in the form and construction thereof may be made as circumstances require or experience suggests without departing from the spirit of the invention as expounded within the scope of the appended claims.

Having thus disclosed and revealed my invention, what I claim as new and desire to secure by Letters Patent is:

1. An horological educational device of the character described, comprising dial means having imprinted thereon hourly indicia and minute indicia thereabove from 5 minutes to 60 minutes in increments of 5 minutes, transparent disc means having a peripherally opaque coronal portion interrupted by a transparent arcuate section and being of such radial magnitude as to cause the said opaque portion to coincide with the portion occupied by the said minute indicia, and having a minute hand opaquely imprinted thereon its tip portion being translucent and being positioned centrally of the said transparent arcuate section, an hour hand element, and attaching means for securing the said transparent disc means and the said hour hand element in independently rotatable relationships to the said dial means.

2. An horological educational device of the character described, comprising clock dial means having imprinted thereon hourly indicia and minute indicia thereabove from 5 minutes to 60 minutes in increments of 5 minutes, transparent disc means having a peripherally opaque coronal portion interrupted by a transparent arcuate section and being of such radial magnitude as to cause the said opaque portion to coincide with the portion occupied by the said minute indicia, and having a minute hand opaquely imprinted thereon its tip portion being translucent and being positioned centrally of the said transparent arcuate section, an hour hand element, and suction cup means for securing the said transparent disc means and the said hour hand element in independently rotatable relationships to the said clock dial means.

EDNA T. WILMINGTON.

References Cited in the file of this patent

UNITED STATES PATENTS

| Number | Name | Date |
|---|---|---|
| 696,690 | Murray | Apr. 1, 1902 |
| 2,172,450 | Pitcher | Sept. 12, 1939 |

FOREIGN PATENTS

| Number | Country | Date |
|---|---|---|
| 17,281 | Great Britain | 1915 |
| 926,995 | France | Apr. 28, 1947 |